United States Patent
Rioux et al.

(10) Patent No.: US 10,801,354 B2
(45) Date of Patent: Oct. 13, 2020

(54) GAS TURBINE ENGINE HAVING HIGH PRESSURE COMPRESSOR CASE ACTIVE CLEARANCE CONTROL SYSTEM

(71) Applicant: United Technologies Corporation, Farmington, CT (US)

(72) Inventors: Philip Robert Rioux, North Berwick, ME (US); Nicholas R. Leslie, South Berwick, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 763 days.

(21) Appl. No.: 15/137,193

(22) Filed: Apr. 25, 2016

(65) Prior Publication Data

US 2017/0306785 A1    Oct. 26, 2017

(51) Int. Cl.
```
F01D 11/20    (2006.01)
F01D 25/24    (2006.01)
F01D 11/24    (2006.01)
F02C 3/04     (2006.01)
```
(52) U.S. Cl.
CPC ............ *F01D 11/20* (2013.01); *F01D 11/24* (2013.01); *F01D 25/243* (2013.01); *F02C 3/04* (2013.01); *F05D 2220/32* (2013.01)

(58) Field of Classification Search
CPC .......... F01D 11/20; F01D 11/24; F01D 25/14; F01D 25/243
See application file for complete search history.

(56) References Cited

U.S. PATENT DOCUMENTS

| | | | | |
|---|---|---|---|---|
| 3,864,056 A | * | 2/1975 | Gabriel | F01D 5/08 415/116 |
| 4,317,646 A | * | 3/1982 | Steel | F01D 11/18 415/116 |
| 7,011,493 B2 | * | 3/2006 | Marchi | F01D 9/04 415/116 |
| 8,550,778 B2 | * | 10/2013 | Koyabu | F01D 11/24 415/115 |
| 2004/0219009 A1 | | 11/2004 | Marchi et al. | |
| 2014/0023490 A1 | * | 1/2014 | Hillier | F01D 11/005 415/173.6 |
| 2017/0175572 A1 | * | 6/2017 | Vetters | F01D 25/12 |

FOREIGN PATENT DOCUMENTS

| | | |
|---|---|---|
| EP | 2770168 A2 | 8/2014 |
| EP | 3115565 A1 | 1/2017 |
| WO | 2015023321 A2 | 2/2015 |

OTHER PUBLICATIONS

European Search Report for EP Application No. 17168032.5; dated Oct. 2, 2017; 13 pages.

* cited by examiner

*Primary Examiner* — Ninh H. Nguyen
*Assistant Examiner* — Aye S Htay
(74) *Attorney, Agent, or Firm* — Cantor Colburn LLP

(57) ABSTRACT

A gas turbine engine includes a first case, a second case, and a fastener. The first case has a first flange defining a first opening. The second case has a second flange defining a second opening. The second flange abuts the first flange. The fastener extends through the first opening and the second opening. The fastener defines a first bore that extends through a fastener head along an axis towards an outlet port defined by a fastener shank.

6 Claims, 5 Drawing Sheets

GAS TURBINE ENGINE HAVING HIGH PRESSURE COMPRESSOR CASE ACTIVE CLEARANCE CONTROL SYSTEM

BACKGROUND

Gas turbine engines include a high pressure compressor disposed within a case. Clearances between components of the high pressure compressor may benefit from case cooling or heating during key points and missions. Unfortunately, active clearance control systems for the high pressure compressor components have not been practical due to several limitations such as a high pressure source of cold cooling air and floating inner cases.

BRIEF DESCRIPTION

According to an embodiment of the disclosure, a gas turbine engine is provided. The gas turbine engine includes a first case, a second case, and a fastener. The first case has a first flange defining a first opening. The second case has a second flange defining a second opening. The second flange abuts the first flange. The fastener extends through the first opening and the second opening. The fastener defines a first bore that extends through a fastener head along an axis towards an outlet port defined by a fastener shank.

In addition to one or more of the features described above, or as an alternative to any of the foregoing embodiments, the fastener defines a second bore extending along the axis towards the fastener head.

In addition to one or more of the features described above, or as an alternative to any of the foregoing embodiments, the second bore is separated from the first bore by a bluff body defined by the fastener shank.

In addition to one or more of the features described above, or as an alternative to any of the foregoing embodiments, the second bore extends towards an inlet port defined by the fastener shank.

In addition to one or more of the features described above, or as an alternative to any of the foregoing embodiments, the outlet port is disposed proximate a first flange interior surface defined by the first opening.

In addition to one or more of the features described above, or as an alternative to any of the foregoing embodiments, the inlet port is disposed proximate a second flange interior surface defined by the second opening.

In addition to one or more of the features described above, or as an alternative to any of the foregoing embodiments, the first flange interior surface, the second flange interior surface and the fastener shank define a cavity that fluidly connects the outlet port and the inlet port.

In addition to one or more of the features described above, or as an alternative to any of the foregoing embodiments, the cavity receives low pressure air that is supplied through the outlet port to at least one of cool and heat the first flange interior surface and the second flange interior surface.

According to another embodiment of the present disclosure, a gas turbine engine is provided. The gas turbine engine includes a first case, a second case, and a fastener. The first case has a first flange that defines a first opening and a first port that extends from a first flange interior surface. The second case has a second flange that defines a second opening and a second port that extends from a second flange interior surface. The fastener has a fastener shank that extends through the first opening and the second opening. The fastener shank defines a first bore that extends along an axis towards an outlet port that is defined by the fastener shank. The outlet port is proximately aligned with the first port.

In addition to one or more of the features described above, or as an alternative to any of the foregoing embodiments, the fastener shank defines a second bore extending along the axis towards an inlet port defined by the fastener shank, the inlet port proximately aligned with the second port.

In addition to one or more of the features described above, or as an alternative to any of the foregoing embodiments, the first port and the second port extend towards a manifold defined by the first flange, the second flange, and an outer air seal.

In addition to one or more of the features described above, or as an alternative to any of the foregoing embodiments, a distribution gland is disposed within the manifold, the distribution gland extending from the first port towards the outer air seal.

In addition to one or more of the features described above, or as an alternative to any of the foregoing embodiments, the distribution gland is configured to receive low pressure air that is supplied to the first bore and distributes the low pressure air within the manifold.

According to yet another embodiment of the present disclosure, a case clearance control system for a gas turbine engine is provided. The case clearance control system includes a fastener that extends through a first opening of a first flange and a second opening of a second flange to couple the first flange to the second flange. The fastener includes a fastener head and a fastener shank. The fastener shank extends from the fastener head along an axis. The fastener shank defines an outlet port that extends transverse to the axis and defines an inlet port that is spaced apart from the outlet port. The inlet port extends transverse to the axis.

In addition to one or more of the features described above, or as an alternative to any of the foregoing embodiments, the fastener head and the fastener shank define a first bore that extends along the axis from the fastener head to the outlet port.

In addition to one or more of the features described above, or as an alternative to any of the foregoing embodiments, the fastener shank defines a second bore that extends along the axis from an end of the fastener shank to the inlet port.

In addition to one or more of the features described above, or as an alternative to any of the foregoing embodiments, the first flange has a first body, a first wall extending from the first body, the first wall defining a first opening, and a first arm extending from the first wall and the second flange has a second body, a second wall extending from the second body, the second wall defining a second opening, and a second arm extending away from the second wall and extending towards the first arm, the first wall, the first arm, the second body, the second wall, and the second arm define a cavity.

In addition to one or more of the features described above, or as an alternative to any of the foregoing embodiments, an inner surface of the first wall defines a plurality of fins that extend towards the second wall.

In addition to one or more of the features described above, or as an alternative to any of the foregoing embodiments, an inner surface of the second wall defines a plurality of fins that extend towards the first wall.

In addition to one or more of the features described above, or as an alternative to any of the foregoing embodiments, the outlet port receives low pressure air to at least one of cool and heat an inner surface of the first wall and the second wall.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied within various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
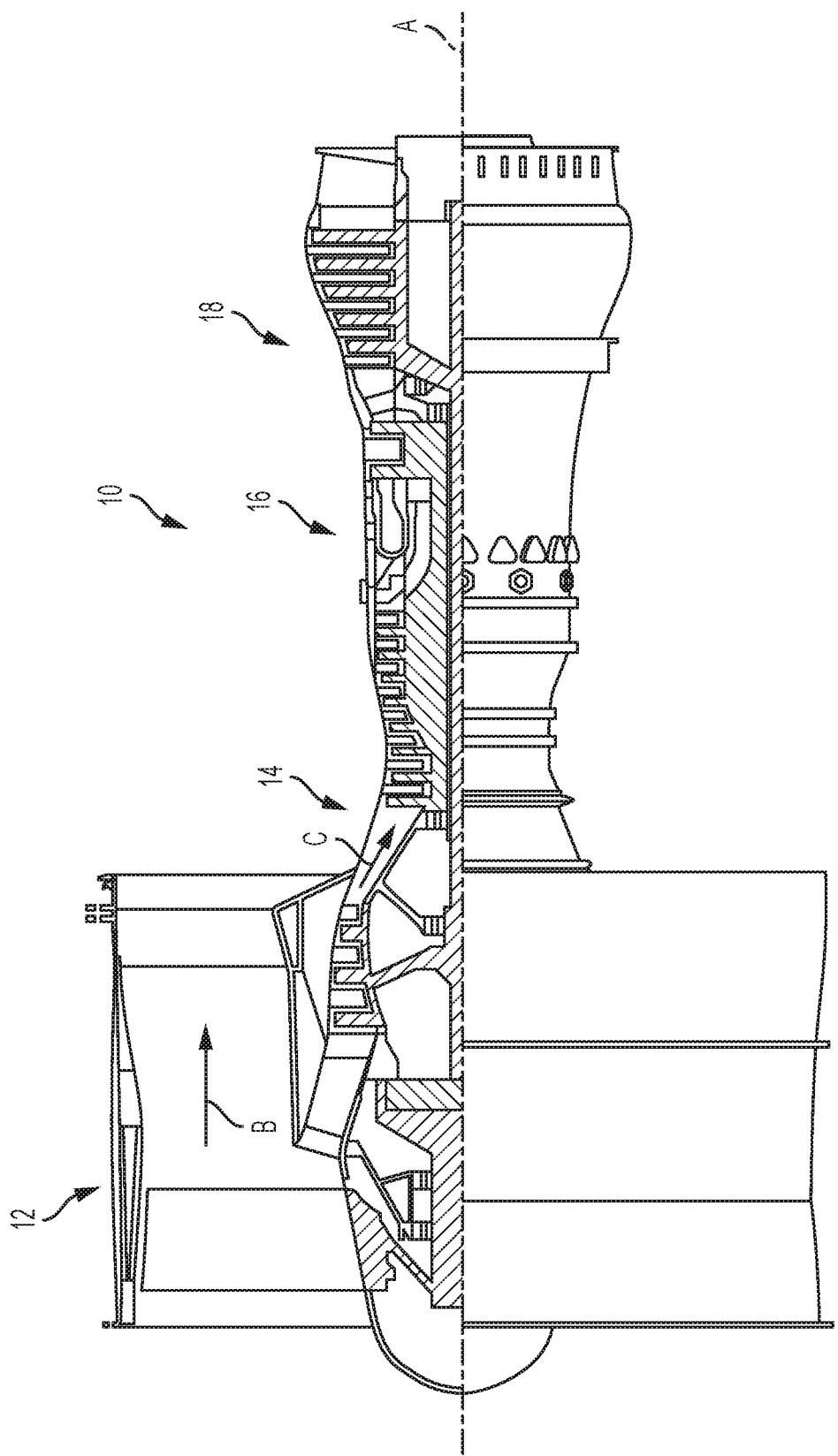
FIG. 1 is a schematic illustration of a gas turbine engine.

Referring to FIG. 1 a gas turbine engine 10 is schematically illustrated. The gas turbine engine 10 may be a two-spool turbofan engine that includes a fan section 12, a compressor section 14, a combustor section 16, and a turbine section 18. Alternative gas turbine engines may include an augmenter section (not shown) among other systems or features. The fan section 12, the compressor section 14, the combustor section 16, and the turbine section 18 may be rotatable about a longitudinal axis A.

The fan section 12 drives air along a bypass flow path B, while the compressor section 14 drives air along a core flow path C for compression and communication into the combustor section 16. Hot combustion gases generated within the combustor section 16 are expanded through the turbine section 18. Although depicted as a turbofan gas turbine engine, it should be understood that the concepts described herein are not limited to turbofan engines and these teachings could extend to other types of engines, including but not limited to, three-spool engine architectures.

Figure 2:
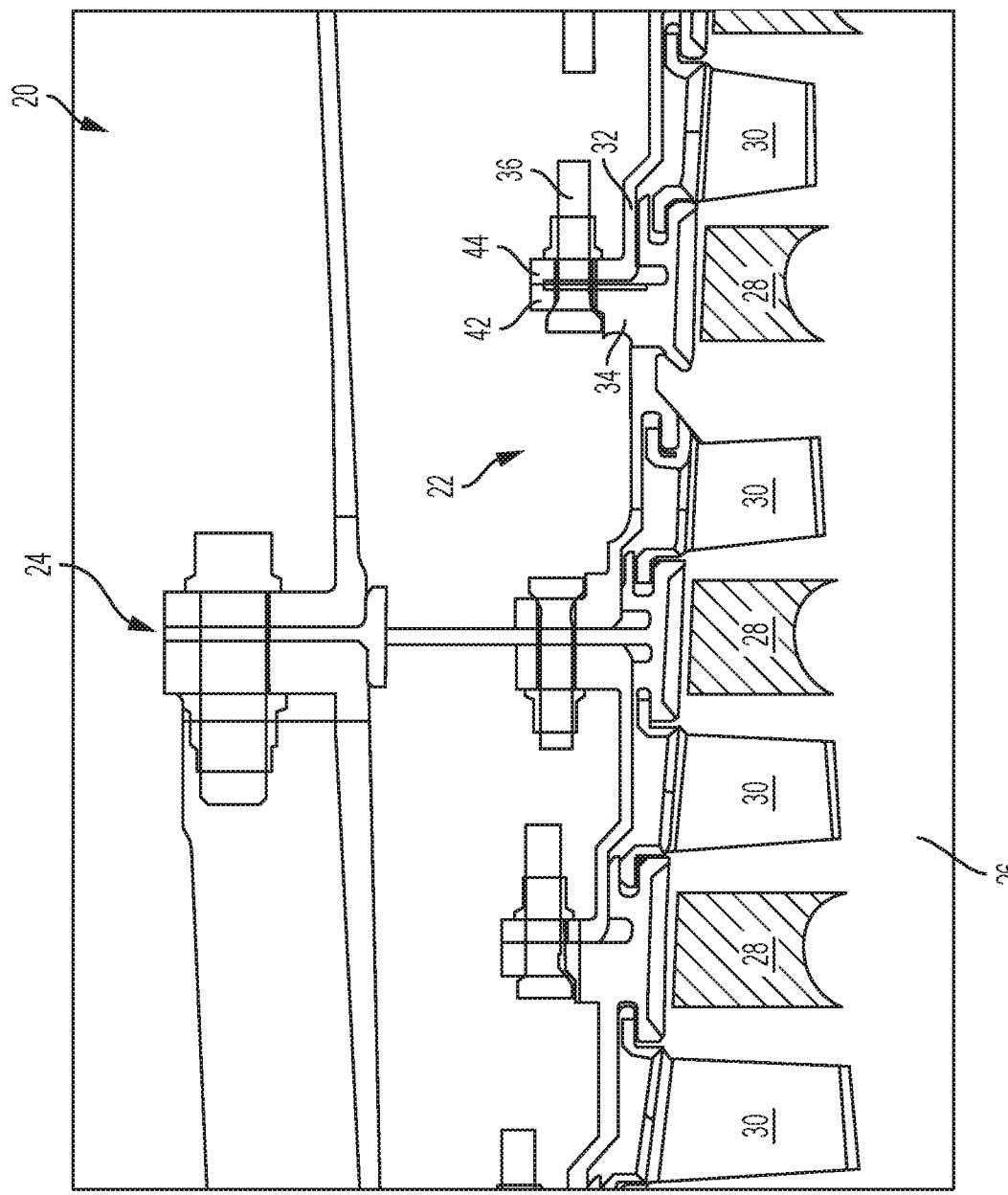
FIG. 2 is a partial section view of a gas turbine engine having a high pressure compressor case.

Referring to FIG. 2, a partial section view of the gas turbine engine 10 is shown. The gas turbine engine 10 includes a case assembly 20 disposed about the compressor section 14. The case assembly 20 includes a high pressure compressor inner case assembly 22 disposed within a high pressure compressor outer case assembly 24. The high pressure compressor inner case assembly 22 includes a high pressure compressor rotor assembly 26, a plurality of rotor blades 28 extending from the high pressure compressor rotor assembly 26, and a plurality of vanes 30 extending from a high pressure compressor outer case assembly 24.

The high pressure compressor inner case assembly 22 further includes a first inner case 34 coupled to a second inner case 32 by a fastener 36. During operation of the gas turbine engine 10 the high pressure compressor inner case assembly 22 may benefit from control of clearances between components of the high pressure compressor inner case assembly 22 and the high pressure compressor rotor assembly 26 by providing cooling or heating air to the flanges of the high pressure compressor inner case assembly 22 or the high pressure compressor outer case assembly 24 by an active case clearance control system 40. The active case clearance control system 40 uses an external air source that may be a heated or cooled air source to change the temperature gradient within the flanges of the case assemblies to control their thermal expansion response. This is used to match the expansion/contraction (thermo-mechanical response) of the rotor during operation to allow for an active rotor tip clearance control to optimize the efficiency of the gas turbine engine 10.

Figure 3:
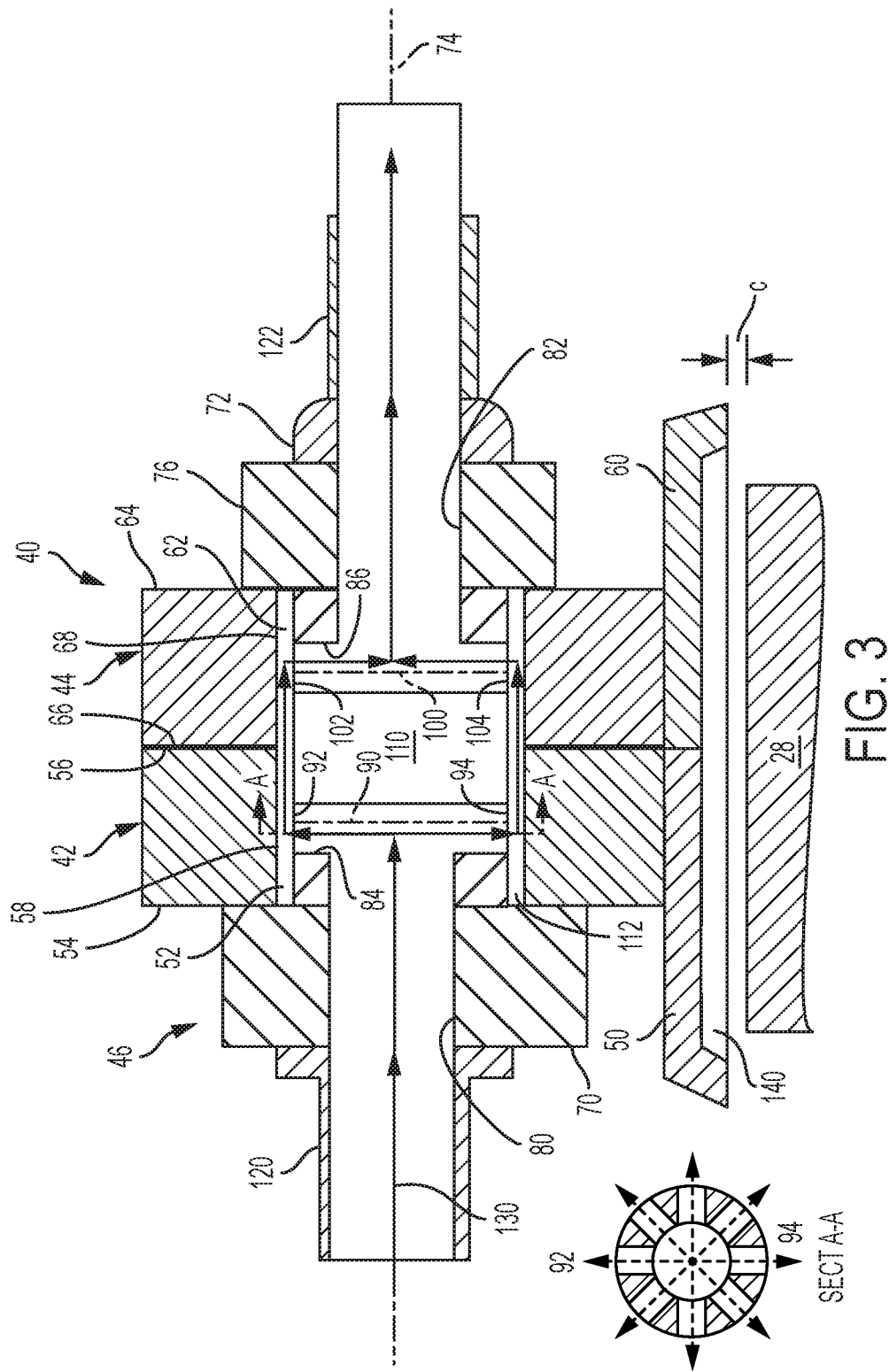
FIG. 3 is a partial section view of an active clearance control system.

Referring to FIG. 3, a partial sectional view of the active case clearance control system 40 is shown. The active case clearance control system 40 includes a first flange 42 of the first inner case 34, a second flange 44 of the second inner case 32, and a clearance control fastener 46.

The first flange 42 extends from a first case body 50 of the first inner case 34. The first flange 42 is disposed substantially perpendicular to the first case body 50 of the first inner case 34. The first flange 42 defines a first opening 52 that extends from a first flange first face 54 to a first flange second face 56. The first flange first face 54 is disposed substantially parallel to the first flange second face 56. The first opening 52 includes a first flange interior surface 58. The first flange interior surface 58 extends about the first opening 52.

The second flange 44 extends from a second case body 60 of the second inner case 32. The second flange 44 is disposed substantially perpendicular to the second case body 60 of the second inner case 32. The second flange 44 defines a second opening 62 that extends from a second flange first face 64 to a second flange second face 66. The second flange first face 64 is disposed substantially parallel to the second flange second face 66. The second flange first face 64 of abuts the first flange first face 54 when the first inner case 34 is coupled to the second inner case 32 by the clearance control fastener 46. The second opening 62 includes a second flange interior surface 68. The second flange interior surface 68 extends about the second opening 62.

The clearance control fastener 46 extends through the first opening 52 of the first flange 42 of the first inner case 34 and extends through the second opening 62 of the second flange 44 of the second inner case 32. The clearance control fastener 46 is configured to take low pressure air from an upstream low pressure air source and flow the low pressure air through the clearance control fastener 46 and into an interior region of at least one of the first flange 42 of the first inner case 34 and the second flange 44 of the second inner case 32 and ultimately delivers the low pressure air to a low pressure sink. The low pressure air cools or heats at least one of the first flange 42 of the first inner case 34 and the second flange 44 of the second inner case 32 from the inside out. By using at least one of the first opening 52 and the second opening 62 minimal reconfiguration of the high pressure compressor inner case assembly 22.

The clearance control fastener 46 includes a fastener head 70, a fastener shank 72 extending from the fastener head 70 along a fastener axis 74, and a coupling nut 76. The clearance control fastener 46 further includes a first bore 80, a second bore 82, an outlet port 84, and an inlet port 86.

The first bore 80 extends through the fastener head 70 and at least partially through the fastener shank 72 along the fastener axis 74. The first bore 80 extends along the fastener axis 74 towards the outlet port 84. The outlet port 84 is defined by the fastener shank 72. The outlet port 84 extends along an outlet port axis 90 that is disposed transverse to the fastener axis 74. The outlet port 84 is disposed proximate the first flange interior surface 58. The outlet port 84 includes a first opening 92 and the second opening 94 radially spaced apart from the first opening 92. As shown in Section A-A the outlet port 84 may contain a plurality of openings.

The second bore 82 extends from an end of the fastener shank 72 disposed opposite the fastener head 70 towards the fastener head 70 along the fastener axis 74. The second bore 82 extends along the fastener axis 74 towards the inlet port 86. The inlet port 86 extends along an inlet port axis 100 that is disposed transverse to the fastener axis 74. The inlet port axis 100 is disposed substantially parallel to the outlet port axis 90. The inlet port 86 is disposed proximate the second flange interior surface 68. The inlet port 86 includes a third opening 102 and a fourth opening 104 radially spaced apart from the third opening 102. Similar to the outlet port, the inlet port 86 may contain a plurality of openings.

The first bore 80 is separated from the second bore 82 by a bluff body 110 defined by the fastener shank 72. The first opening 92 and the second opening 94 of the outlet port 84 are separated from the third opening 102 and the fourth opening 104 of the inlet port 86 by the bluff body 110.

The first flange interior surface 58, the second flange interior surface 68, and the fastener shank 72 define a cavity 112. The cavity 112 fluidly connects the outlet port 84 to the inlet port 86. The outlet port 84 provides an inlet into the cavity 112 for low pressure air 130 received through an entrance component 120 fluidly connected to the first bore 80 of the fastener head 70. The inlet port 86 provides an outlet from the cavity 112 for the low pressure air that cools or heats the interior surfaces of the flanges to an exit component 122 fluidly connected to the second bore 82 of the fastener shank 72. The entrance component 120 and exit component 122 may be fittings, bolts, cavities, instrumentation egress is, pipes, tubing, or the like that are configured to deliver and receive air.

The low pressure air 130 that cools or heats the interior surfaces of the flanges that exits through the exit component 122 may be provided to a subsequent clearance control fastener downstream of the clearance control fastener 46. In at least one embodiment, the low pressure air that cools or heats the interior surfaces of the flanges that exits through the exit component 122 may be provided to a bleed air pipe, a bleed air manifold, a low pressure turbine, overboard into a nacelle purge, routed through at least one of the first inner case 34 and the second inner case 32 to an existing cooling air pipe, or provided to a bearing cooling air system. The active case clearance control system 40 controls a rotor tip clearance, c, between a rotor blade of the plurality of rotor blades 28 and at least one of the first case body 50 and the second case body 60 and an outer air seal 140. This maintains a more consistent clearance, c, between a tip of a rotor blade of the plurality of rotor blades 28 to reduce rubbing between the tip of the rotor blade of the plurality of rotor blades 28 and the abradable material disposed on the outer air seal 140. This increases or improves the aerodynamic efficiency of a given stage that incorporates the active case clearance control system 40.

Figure 4:
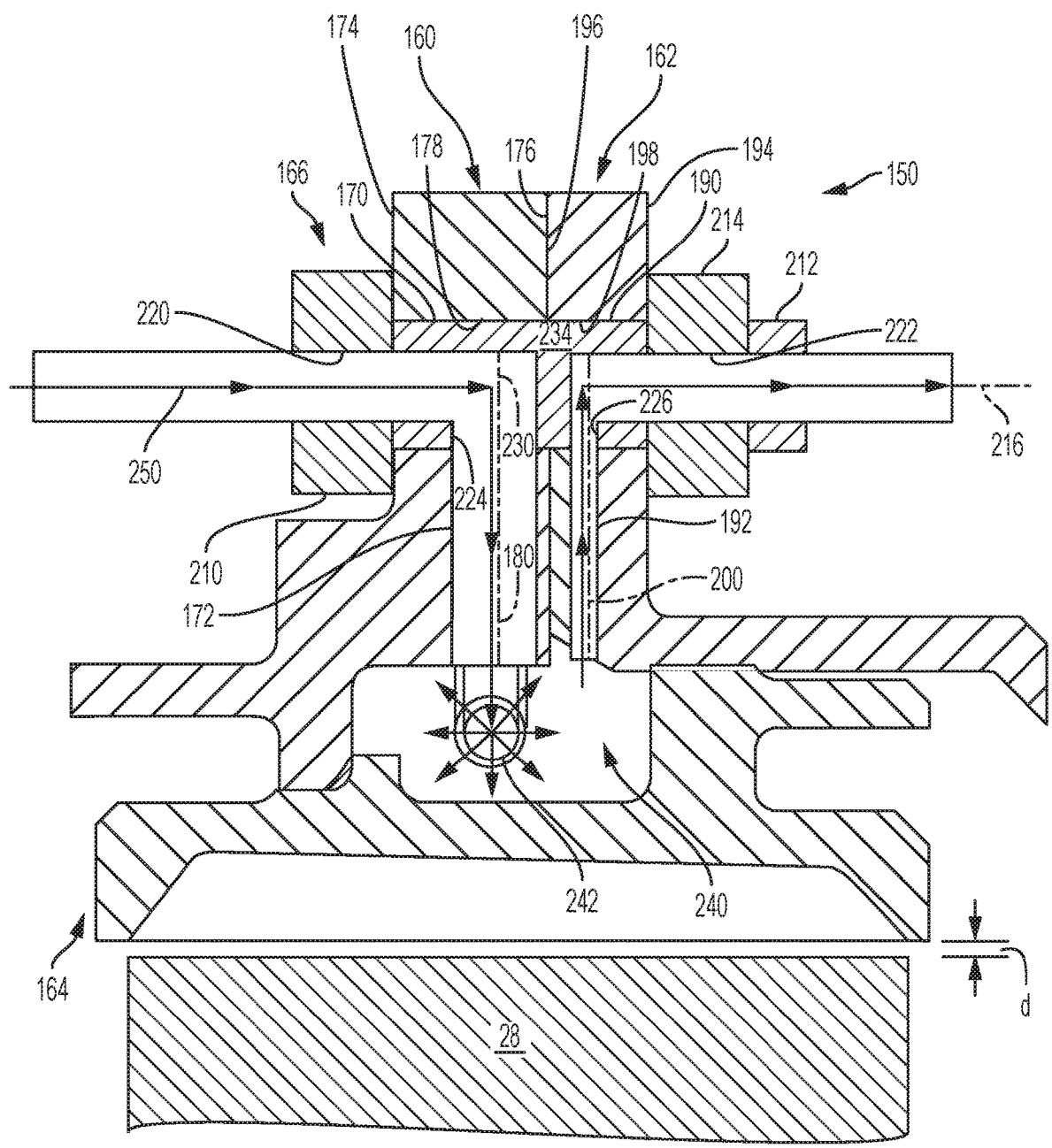
FIG. 4 is a partial section view of an active clearance control system.

Referring to FIG. 4, a partial sectional view of the second illustrative active case clearance control system 150 is shown. The active case clearance control system 150 includes a first flange 160 of the first inner case 34, a second flange 162 of the second inner case 32, an outer air seal 164, and a clearance control fastener 166.

The first flange 160 extends from the first case body 50 of the first inner case 34. The first flange 160 defines a first opening 170 and a first port 172. The first opening 170 extends from a first flange first face 174 to a first flange second face 176. The first opening 170 includes a first flange interior surface 178 that extends circumferentially about the interior of the first opening 170. The first port 172 extends tangentially from the first flange interior surface 178 along a first port axis 180.

The second flange 162 extends from the second case body 60 of the second inner case 32. The second flange 162 defines a second opening 190 and a second port 192. The second opening 190 extends from a second flange first face 194 to the second flange second face 196. The second flange second face 196 of the second inner case 32 abuts the first flange second face 176 of the first inner case 34 when the first inner case 34 is coupled to the second inner case 32 by the clearance control fastener 166.

The second opening 190 includes a second flange interior surface 198 that extends circumferentially about the second opening 190. The second port 192 extends tangentially from the second flange interior surface 198 along a second port axis 200. The second port axis 200 is disposed substantially parallel to the first port axis 180.

The clearance control fastener 166 includes a fastener head 210, a fastener shank 212, and a coupling nut 214. The fastener shank 212 extends from the fastener head 210 along a fastener axis 216. The fastener shank 212 extends through the first opening 170 of the first flange 160 and the second opening 190 of the second flange 162. The clearance control fastener 166 includes a first bore 220, a second bore 222, an outlet port 224, and an inlet port 226.

The first bore 220 extends through the fastener head 210 and at least partially through the fastener shank 212 along the fastener axis 216. In at least one embodiment, the fastener head 210 is not provided. In such an embodiment, the first bore 220 extends at least partially through the fastener shank 212 along the fastener axis 216. The first bore 220 extends along the fastener axis 216 towards the outlet port 224. The outlet port 224 is defined by the fastener shank 212. The outlet port 224 extends along an outlet port axis 230 that is disposed transverse to the fastener axis 216. The outlet port 224 is proximately aligned with the first port 172 such that the outlet port axis 230 is proximately aligned with the first port axis 180.

The second bore 222 extends from an end of the fastener shank 212 disposed opposite the fastener head 210 along the fastener axis 216. The second bore 222 is disposed opposite the first bore 220. The second bore 222 extends along the fastener axis 216 towards the inlet port 226. The inlet port 226 is defined by the fastener shank 212. The inlet port 226 extends along an inlet port axis 232 that is disposed transverse to the fastener axis 216. The inlet port axis 232 is disposed substantially parallel to the outlet port axis 230. The inlet port 226 is proximately aligned with the second port 192 such that the inlet port axis 232 is proximately aligned with the second port axis 200.

The first bore 220 is separated from the second bore 222 by a portion of the body 234 of the fastener shank 212. The outlet port 224 is separated from the inlet port 226 by the portion of the body 234 of the fastener shank 212.

The first flange 160, the second flange 162, and the outer air seal 164 define a manifold 240. The manifold 240 fluidly connects the outlet port 224 and the first port 172 to the inlet port 226 and the second port 192. The first port 172 and the second port 192 extend towards the manifold 240.

A distribution gland 242 is disposed within the manifold 240. The distribution gland 242 extends from the first port 172 towards the outer air seal 164. The distribution gland 242 is configured to receive low pressure air 250 that is supplied to the first bore 220 through the first port 172 and distributes the low pressure air 250 within the manifold 240. The distributed low pressure air 250 within the manifold 240 is configured to cool at least one of the first flange 160, the second flange 162, and the outer air seal 164. The distributed low pressure air 250 is configured to exit through the second port 192 and through the second bore 222. The active case clearance control system 150 controls a rotor tip clearance, d, between a rotor blade of the plurality of rotor blades 28 and the outer air seal 164. This maintains a more consistent clearance, d, between a tip of a rotor blade of the plurality of rotor blades 28 to reduce rubbing between the tip of the rotor blade of the plurality of rotor blades 28 and an abradable material disposed on the outer air seal 164. This increases or improves the aerodynamic efficiency of a given stage that incorporates the active case clearance control system 150.

Figure 5:
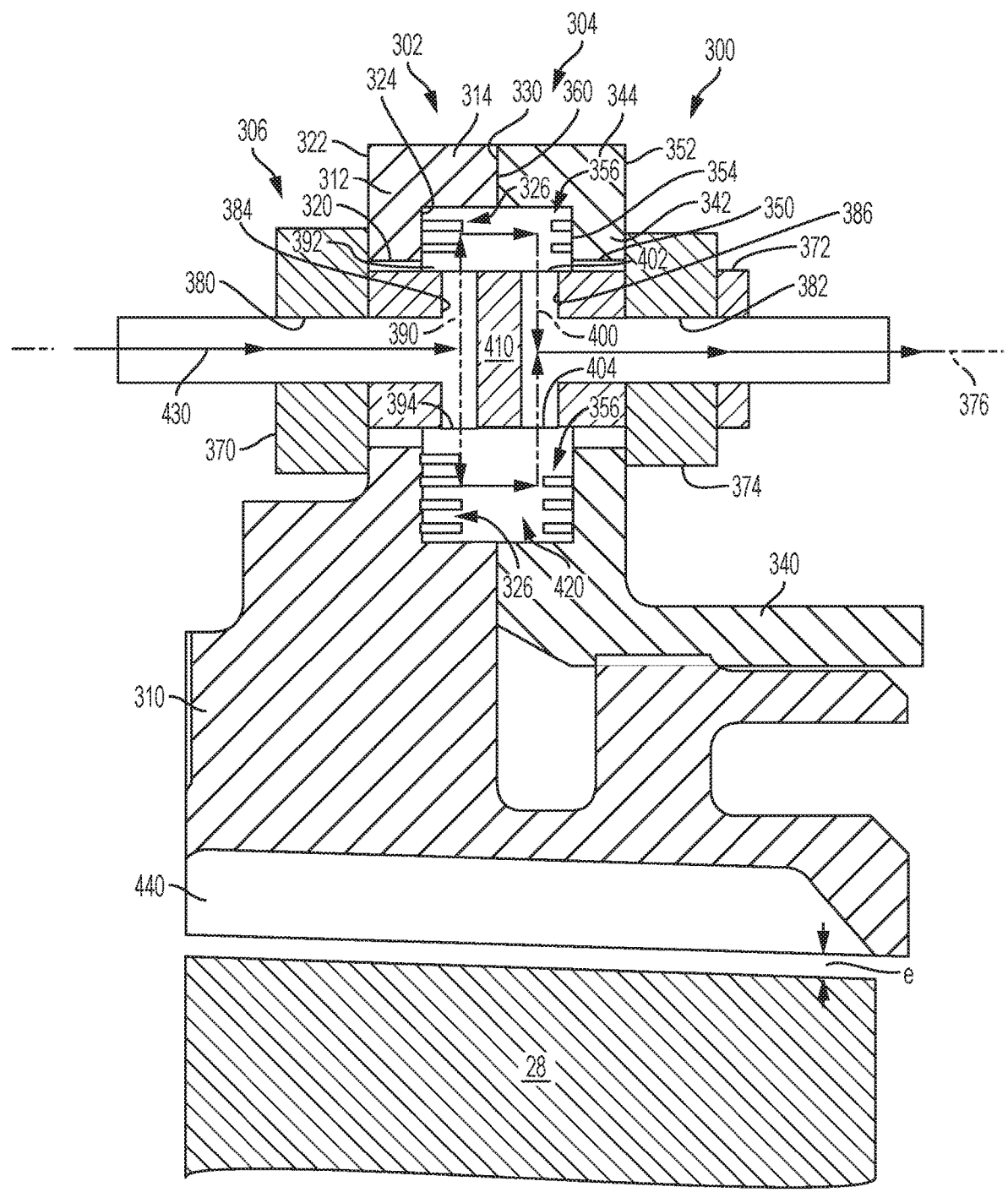
FIG. 5 is a partial section view of an active clearance control system.

Referring to FIG. 5, a partial sectional view of the third illustrative active case clearance control system 300 is shown. The active case clearance control system 300 includes a first flange 302 of a first case, a second flange 304 of a second case, and a clearance control fastener 306.

The first flange 302 includes a first body 310, a first wall 312, and a first arm 314. The first wall 312 extends from the first body 310. The first wall 312 defines a first opening 320 that extends from a first wall outer surface 322 to a first wall inner surface 324. The first wall inner surface 324 defines a first plurality of fins 326. The first plurality of fins 326 extend away from the first wall inner surface 324.

The first arm 314 extends from an end of the first wall 312. The first arm 314 is disposed substantially perpendicular to the first wall 312. The first arm 314 is disposed substantially parallel to the first plurality of fins 326. The first arm 314 includes a first arm end face 330. The first arm end face 330 is disposed substantially parallel to the first wall inner surface 324. The first arm end face 330 is spaced apart from the first wall inner surface 324.

The second flange 304 includes a second body 340, a second wall 342, and a second arm 344. The second wall 342 extends from the second body 340. The second wall 342 defines a second opening 350 that extends from a second wall outer surface 352 to a second wall inner surface 354. The second wall inner surface 354 defines a second plurality of fins 356. The second plurality of fins 356 extend away from the second wall inner surface 354 towards the first wall 312.

The second arm 344 extends from an end of the second wall 342. The second arm 344 is disposed substantially perpendicular to the second wall 342. The second arm 344 is disposed substantially parallel to the second plurality of fins 356. The second arm 344 includes a second arm end face 360. The second arm end face 360 is spaced apart from the second wall inner surface 354.

The second arm end face 360 abuts the first arm end face 330 and the second body 340 abuts the first body 310 when the first flange 302 of the first case is coupled to the second flange 304 of the second case by the clearance control fastener 306. The clearance control fastener 306 extends through the first opening 320 of the first flange 302 and the second opening 350 of the second flange 304.

The clearance control fastener 306 includes a fastener head 370, a fastener shank 372, and a coupling nut 374. The fastener shank 372 extends from the fastener head 370 along a fastener axis 376. The fastener shank 372 extends through the first opening 320 to the first flange 302 and the second opening 350 of the second flange 304.

The clearance control fastener 306 includes a first bore 380, a second bore 382, an outlet port 384, and an inlet port 386. The first bore 380 extends through the fastener head 370 and at least partially through the fastener shank 372 along the fastener axis 376. The first bore 380 extends along the fastener axis 376 towards the outlet port 384. The outlet port 384 is defined by the fastener shank 372. The outlet port 384 extends along an outlet port axis 390 that is disposed transverse to the fastener axis 376. The outlet port 384 includes a first opening 392 and the second opening 394 radially spaced apart from the first opening 392. In at least one embodiment, additional openings may be provided.

The second bore 382 extends from an end of the fastener shank 372 disposed opposite the fastener head 370 towards the fastener head 370 along the fastener axis 376. The second bore 382 extends along the fastener axis 376 towards the inlet port 386. The inlet port 386 extends along an inlet port axis 400 that is disposed transverse to the fastener axis 376. The inlet port axis 400 is disposed substantially parallel to the outlet port axis 390. The inlet port 386 includes a third opening 402 and a fourth opening 404 radially spaced apart from the third opening 402. In at least one embodiment, additional openings may be provided.

The first bore 380 is separated from the second bore 382 by a body 410 defined by the fastener shank 372. The first opening 392 and the second opening 394 of the outlet port 384 are separated from the third opening 402 and the fourth opening 404 of the inlet port 86 by the body 410.

The first body 310, the first wall 312, and the first arm 314 of the first flange 302 and the second body 340, the second wall 342, and the second arm 344 of the second flange 304 define a cavity 420. The cavity 420 fluidly connects the outlet port 384 to the inlet port 386. The outlet port 384 provides an inlet into the cavity 420 for low pressure air 430 received through the first bore 380 of the clearance control fastener 306. The inlet port 386 receives the low pressure air 430 that cools or heats the inner wall surfaces of the flanges and provides that air to the second bore 382 of the clearance control fastener 306.

The low pressure air 430 that enters into the cavity 420 may have an enhanced cooling effect due to at least one of the first plurality of fins 326 and the second plurality of fins 356. At least one of the first plurality of fins 326 and the second plurality of fins 356 increases the heat transfer rate and thus enhances the cooling effect of the low pressure air 430. The first plurality of fins 326 and the second plurality of fins 356 may have geometric shapes such as grooves, ridges, trip strips, protrusions, projections, or the like that increase contact area and the heat transfer rate. The active case clearance control system 300 controls a rotor tip clearance, e, between a rotor blade of the plurality of rotor blades 28 and the first body 310 and an outer air seal 440. This maintains a more consistent clearance, e, between a tip of a rotor blade of the plurality of rotor blades 28 to reduce rubbing between the tip of the rotor blade of the plurality of rotor blades 28 and an abradable material disposed on the outer air seal 440. This increases or improves the aerodynamic efficiency of a given stage that incorporates the active case clearance control system 300.

The active clearance control systems provide direct flange cooling or heating that allows for active control of the high pressure compressor component clearances. In at least one embodiment, the active clearance control systems provide approximately 0.005 inches of close down at steady-state gas turbine engine operating points. This allows for more open clearances on bowed rotor starts, or other rub points in the mission, as well as increasing the gas turbine engine efficiency at steady-state operating points. The active clearance control systems may also be used to speed up the flange responses during deceleration to better match the transient rotor response of the high pressure compressor.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A gas turbine engine, comprising:
a first case having a first case body and a first flange defining a first opening, wherein the first flange extends perpendicularly away from the first case body;
a second case having a second case body and a second flange defining a second opening that is aligned with and fluidly connected to the first opening, wherein the second flange extends perpendicularly away from the second case body, and the second flange abuts the first flange;
a clearance control fastener including a fastener head abutting a side of the first flange, a coupling nut abutting a side of the second flange; and
a fastener shank that extends along an axis defined by the fastener shank, from the fastener head to the coupling nut, through the first and second openings,
wherein:
the first and second openings extend parallel to the axis, between the fastener head and the coupling nut, and are spaced apart from the first and second case bodies;
the fastener head and the fastener shank defining a first bore, wherein the first bore extends through the fastener head and the fastener shank along the axis;
the fastener shank defining an outlet port fluidly connected to the first bore and the first opening, wherein the outlet port extends transverse to the axis;
the fastener shank further defining an inlet port and a second bore that are fluidly connected to each other and the second opening, wherein the inlet port extends transverse to the axis, and wherein the second bore extends through the fastener shank and the coupling nut along the axis, and
the first bore extends through the fastener head along the axis and toward the outlet port, and wherein the second bore extends from an end of the fastener shank toward the inlet port, and wherein the first bore and the second bore are separated by a buff body defined on the axis by the fastener shank.

2. The gas turbine engine of claim 1, wherein the outlet port is disposed proximate a first flange interior surface defined by the first opening.

3. The gas turbine engine of claim 2, wherein the inlet port is disposed proximate a second flange interior surface defined by the second opening.

4. The gas turbine engine of claim 3, wherein the first flange interior surface, the second flange interior surface and the fastener shank define a cavity that fluidly connects the outlet port and the inlet port.

5. The gas turbine engine of claim 4, wherein the cavity receives low pressure aft that is supplied through the outlet port to cool or heat the first flange interior surface and the second flange interior surface.

6. A case clearance control system for a gas turbine engine, comprising:
a first case having a first case body and a first flange defining a first opening, wherein the first flange extends perpendicularly away from the first case body;
a second case having a second case body and a second flange defining a second opening that is aligned with and fluidly connected to the first opening, wherein the second flange extends perpendicularly away from the second case body, and the second flange abuts the first flange;
a clearance control fastener including a fastener head abutting a side of the first flange, a coupling nut abutting a side of the second flange; and
a fastener shank that extends along an axis defined by the fastener shank, from the fastener head to the coupling nut, through the first and second openings,
wherein;
the first and second openings extend parallel to the axis, between the fastener head and the coupling nut, and are spaced apart from the first and second case bodies;
the fastener head and the fastener shank define a first bore, wherein the first bore extends through the fastener head and the fastener shank along the axis;
the fastener shank defining an outlet port fluidly connected to the first bore and the first opening, wherein the outlet port extends transverse to the axis;
the fastener shank further defining an inlet port and a second bore that are fluidly connected to each other and the second opening, wherein the inlet port extends transverse to the axis, and wherein the second bore extends through the fastener shank and the coupling nut along the axis; and
the first bore extends through the fastener head along the axis and toward the outlet port, and wherein the second bore extends from an end of the fastener shank toward the inlet port, and wherein the first bore and the second bore are separated by a bluff body defined on the axis by the fastener shank.

* * * * *